United States Patent [19]

Stahly et al.

[11] 4,277,181

[45] Jul. 7, 1981

[54] FOOD MIXER

[75] Inventors: Daniel C. Stahly, Elmhurst; William H. Scott, Lombard; Mohamed K. Wagdy, DesPlaines, all of Ill.

[73] Assignee: Sunbeam Corporation, Chicago, Ill.

[21] Appl. No.: 33,584

[22] Filed: Apr. 26, 1979

[51] Int. Cl.³ .............................. B01F 7/32; B01F 13/00
[52] U.S. Cl. ........................................ 366/69; 74/16; 366/98; 366/298; 366/300; 366/343
[58] Field of Search ................. 366/69, 94, 54, 59, 366/64, 144, 300, 301, 297, 95, 343, 98, 344; 416/95; 74/16

[56] References Cited

U.S. PATENT DOCUMENTS

| | | |
|---|---|---|
| 422,265 | 2/1890 | Depoele . |
| 762,074 | 6/1904 | Lueth . |
| 769,193 | 9/1904 | Smith ................................ 366/98 |
| 783,085 | 2/1905 | Stevens .............................. 366/98 |
| 850,991 | 4/1907 | Abbott ............................... 366/98 |
| 1,090,159 | 3/1914 | Lincoln . |
| 1,285,874 | 11/1918 | Woodbridge . |
| 1,863,018 | 6/1932 | MacCutcheon . |
| 1,966,057 | 7/1934 | Winkel . |
| 2,185,155 | 12/1939 | Meeker . |
| 2,186,240 | 1/1940 | Fockler . |
| 2,234,695 | 3/1941 | Hanna . |
| 2,262,912 | 11/1941 | Behar . |
| 2,293,959 | 8/1942 | Wright . |
| 2,317,098 | 4/1943 | Gough ............................... 366/300 |
| 2,368,597 | 2/1945 | Strauss . |
| 2,438,465 | 3/1948 | Strauss . |
| 2,444,298 | 6/1948 | Kline . |
| 2,475,842 | 7/1949 | Jones . |
| 2,515,755 | 7/1950 | Krause ............................... 366/344 |
| 2,571,316 | 10/1951 | Guilder ............................. 366/197 |
| 2,577,896 | 12/1951 | Kinton .............................. 416/199 |
| 2,615,691 | 10/1952 | Bisley . |
| 2,632,635 | 3/1953 | Guilder . |
| 2,719,702 | 10/1955 | Brace . |
| 2,727,395 | 12/1955 | White . |
| 2,745,644 | 5/1956 | Behren . |
| 2,900,540 | 8/1959 | Gartner . |
| 3,097,318 | 7/1963 | Jepson . |
| 3,224,743 | 12/1965 | Freedman . |
| 3,231,772 | 1/1966 | Polenschat . |
| 3,279,265 | 10/1966 | Braun . |
| 3,312,433 | 4/1967 | Peterson . |
| 3,314,660 | 4/1967 | Arbiter . |
| 3,508,098 | 4/1970 | Ciolli . |
| 3,589,834 | 6/1971 | Coirelli ............................. 416/95 |
| 3,654,504 | 4/1972 | Susdorf ............................. 310/239 |
| 3,656,718 | 4/1972 | Coirelli . |
| 3,749,373 | 7/1973 | Kemper . |
| 3,904,178 | 9/1975 | Scott . |
| 3,924,169 | 12/1975 | Craft ................................. 318/354 |
| 3,963,220 | 6/1976 | Ohchi . |
| 4,070,711 | 1/1978 | Smader ............................. 366/343 |
| 4,071,789 | 1/1978 | Ernster ............................. 310/50 |
| 4,176,971 | 12/1979 | Ernster ............................. 366/69 |

OTHER PUBLICATIONS

Hobart Kitchen Aid-7/1958.
Electrical Merchandising Week-7/8/1963-p. 17.

Primary Examiner—Edward J. McCarthy
Attorney, Agent, or Firm—George R. Clark; Neil M. Rose; Robert J. Fox

[57] ABSTRACT

A food mixer having a stand with a mixer head pivotally mounted thereon for mixing foods is disclosed herein. The mixer includes means for cooling a drive assembly by drawing air in through a forward portion of the head and exhausting it out a bottom portion of the stand. The mixer is provided with a locking latch interconnecting the head and the stand in order to mix or knead properly heavy or viscous foods, such as bread dough. A pair of dough hooks, which are adapted to force dough away from the head during kneading, are detachably connectable to the head. A high outer wall turntable is rotatably supported on a base of the stand by a peripheral thrust bearing to provide a stable platform for a mixing bowl. Each mixing bowl used with the mixer has the same diameter bottom and lower contour regardless of bowl volume. A mechanical governor is connected to an electronic control to provide accurate motor speed regulation throughout the range of motor speed operation.

42 Claims, 20 Drawing Figures

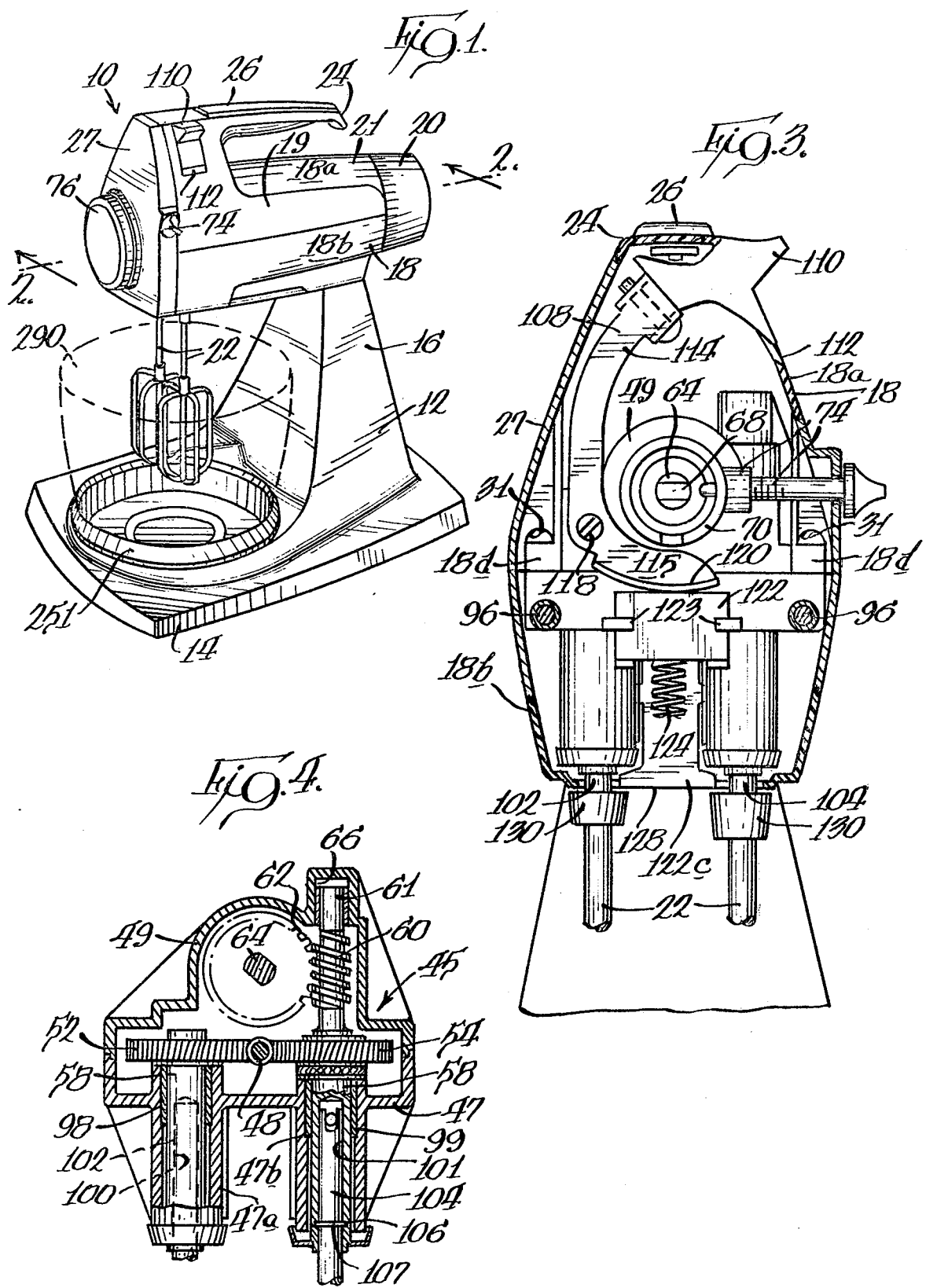

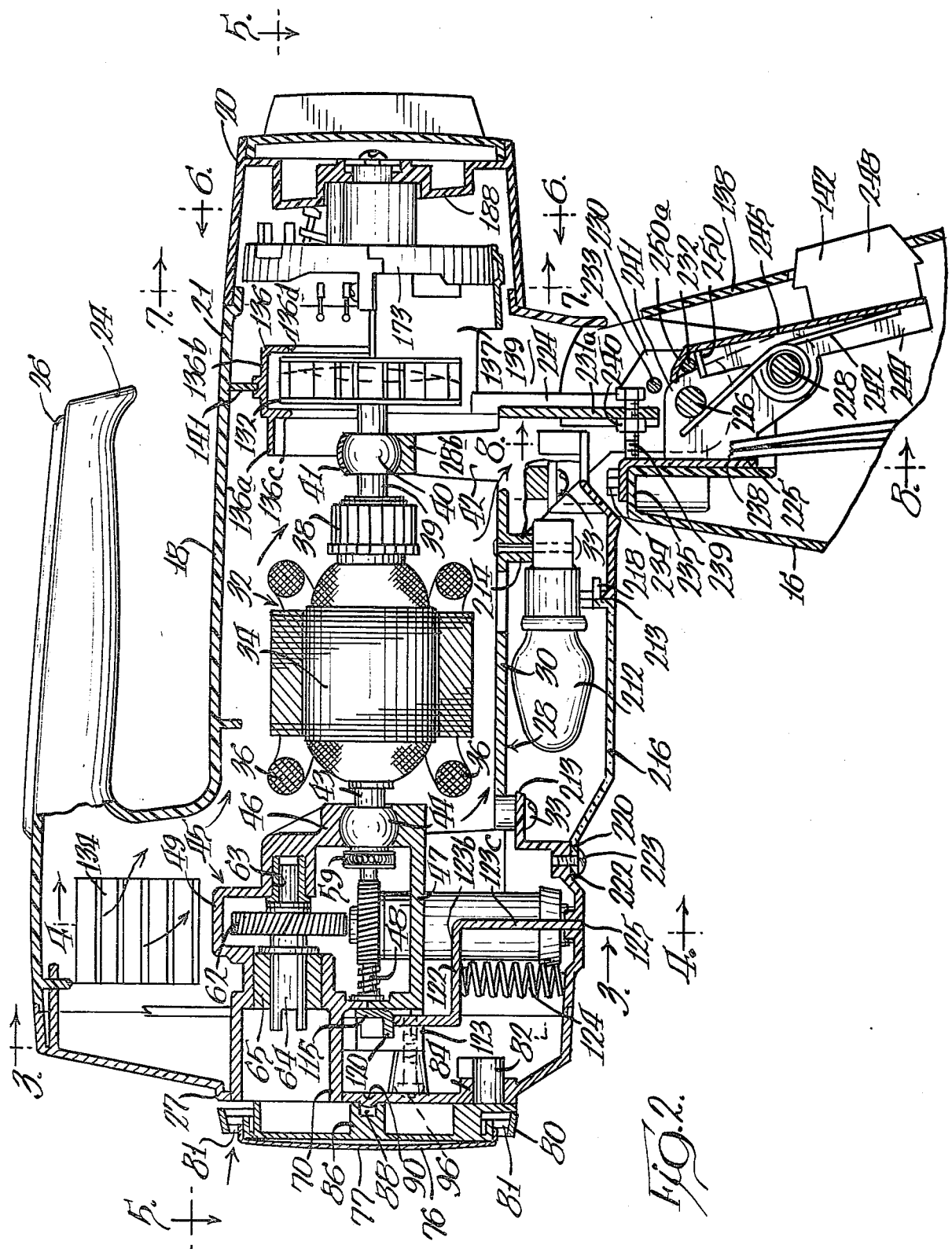

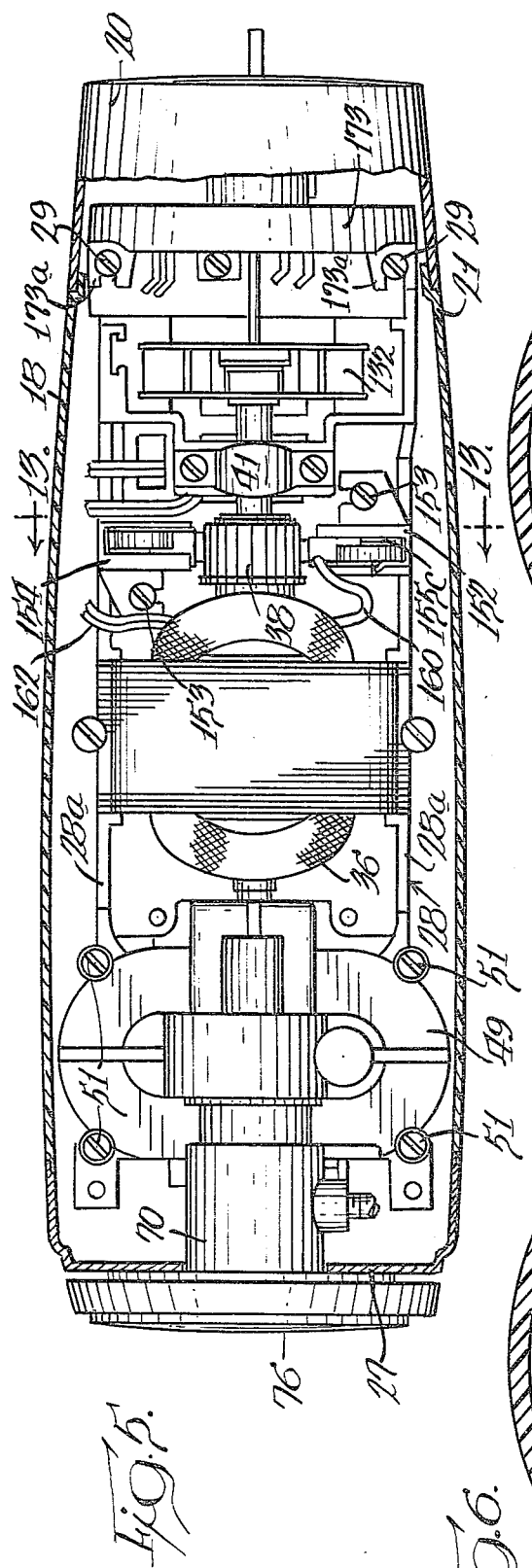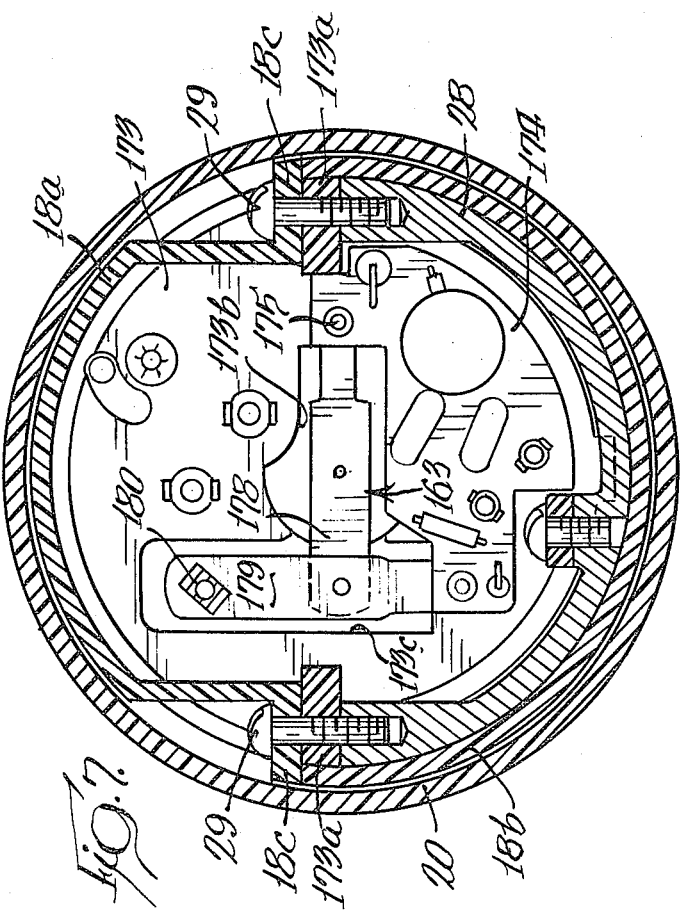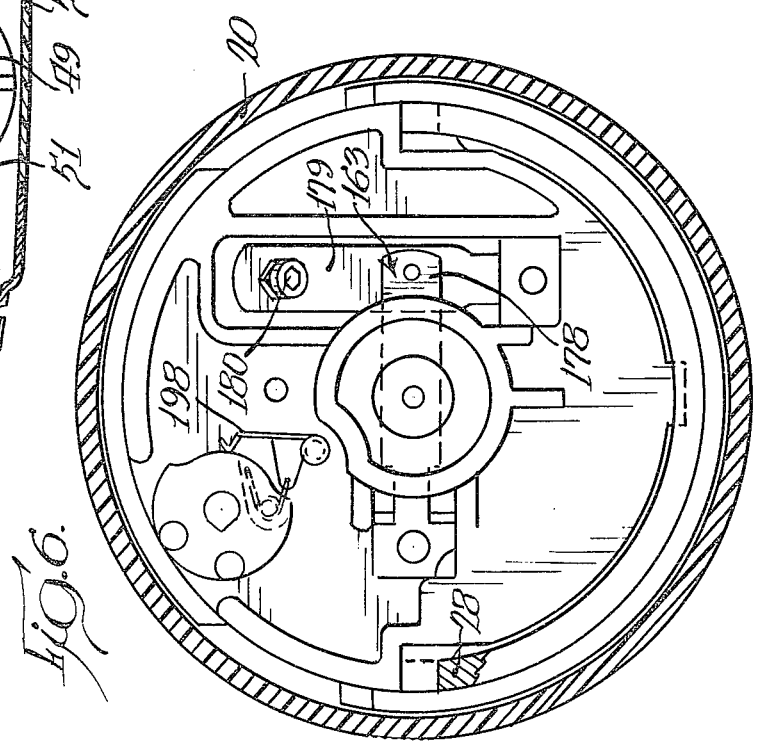

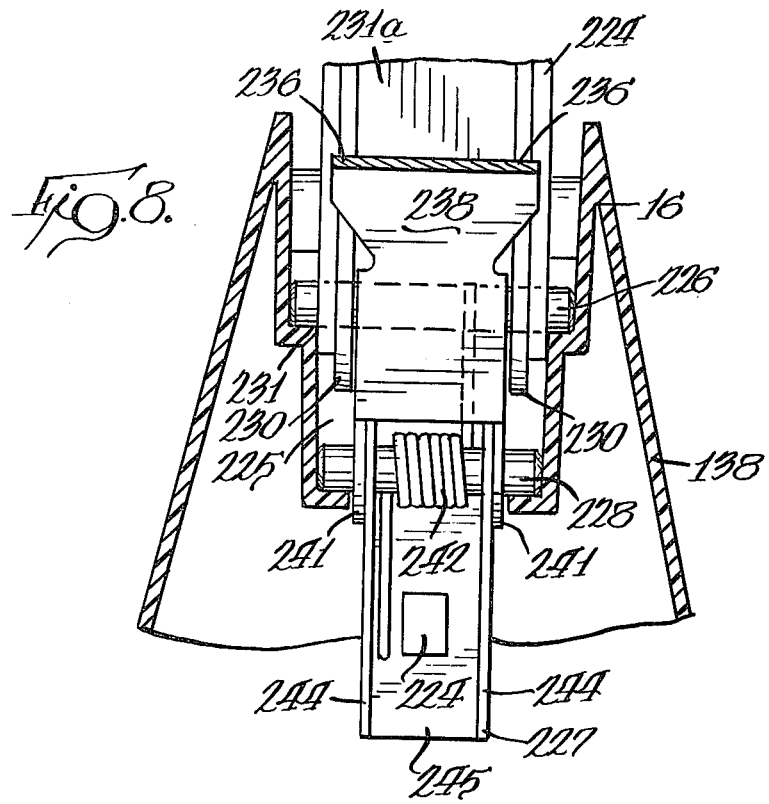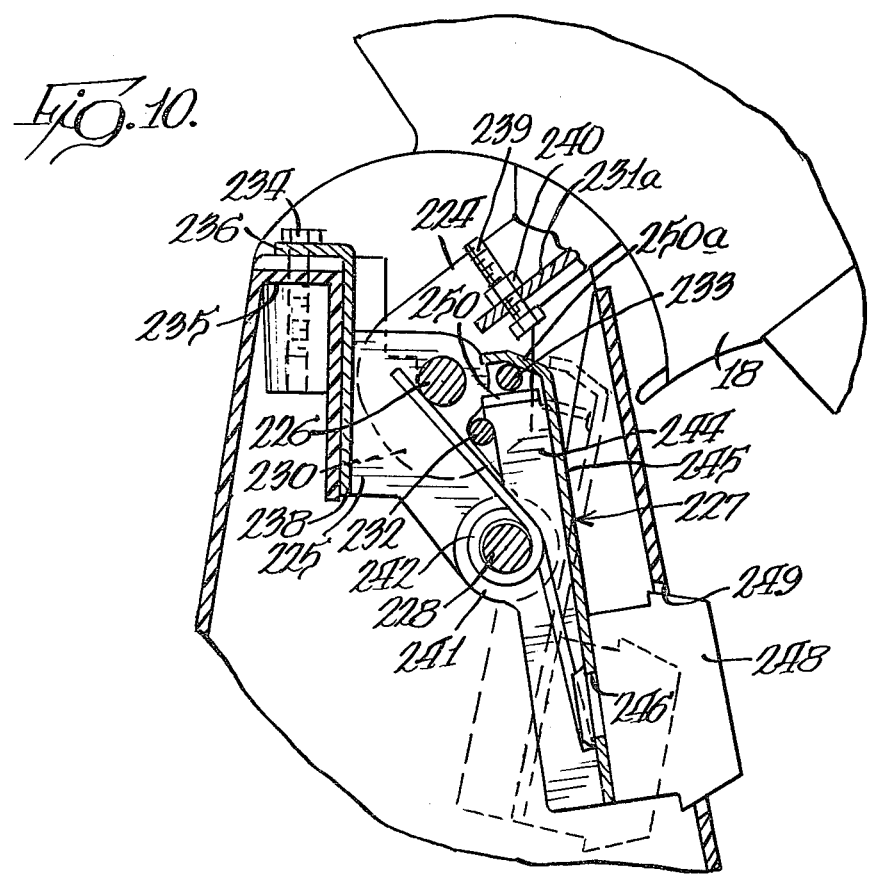

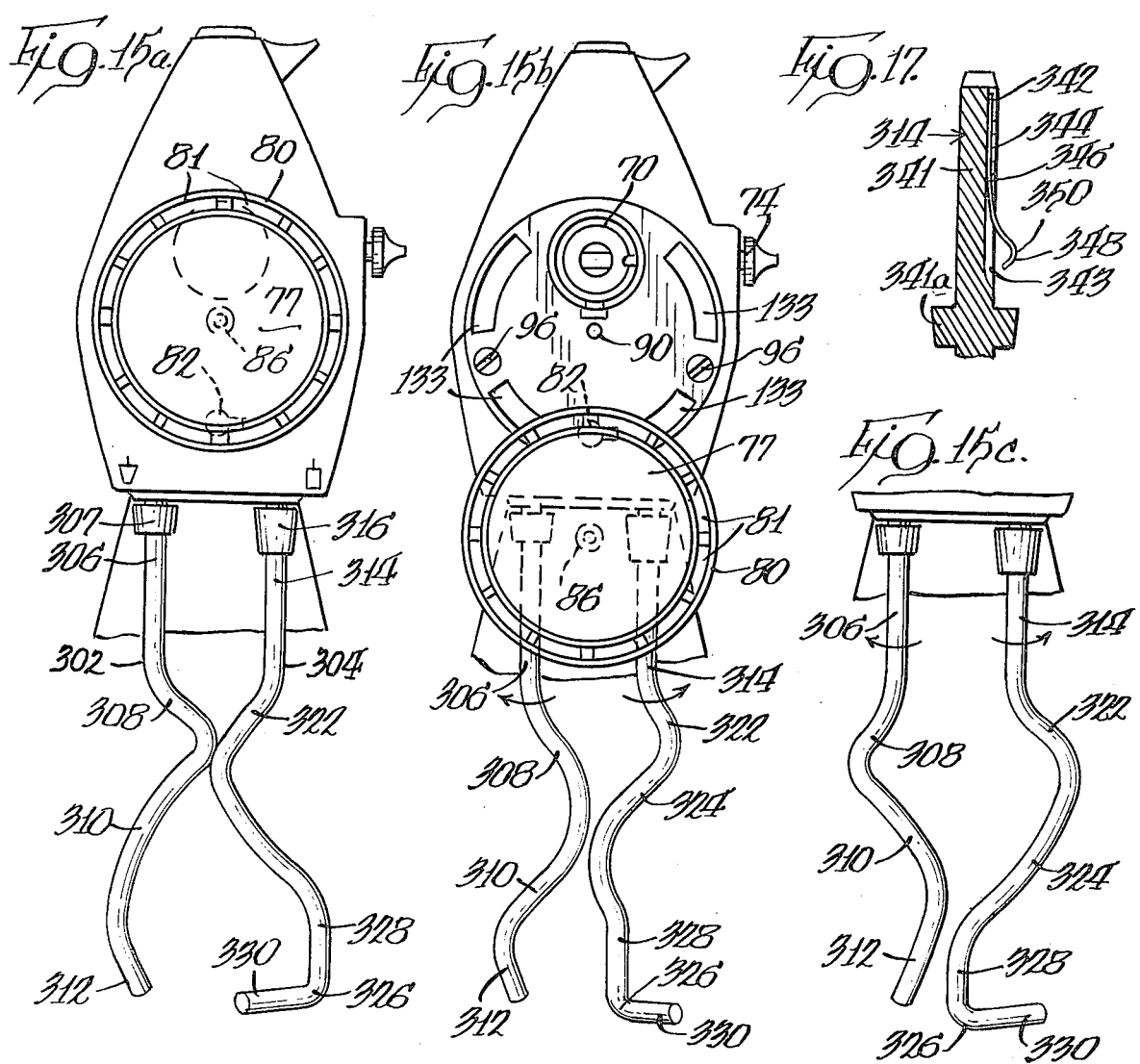
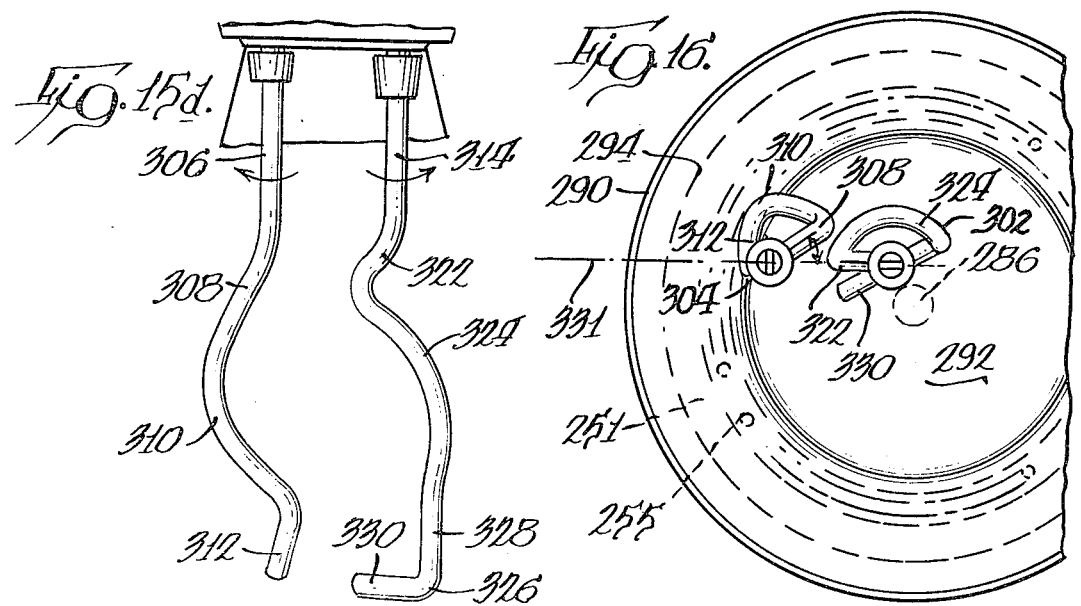

FOOD MIXER

BACKGROUND OF THE INVENTION

There are a wide variety of domestic food mixers, which are currently being marketed and which may be categorized into two broad classifications. The first classification includes the well-known lightweight mixer of the portable variety often used for mixing small amounts of material. The other type of mixer is the stand type, which is used for mixing larger quantities and has recently been used for kneading bread doughs and mixing other heavy foodstuffs as well.

The stand mixer may be described as having a drive unit within a housing mounted on a stand having a turntable. The turntable is rotatably mounted on a central rotating assembly having a shaft and center bearing and receives a bowl for holding the material to be mixed. The periphery of the turntable is unsupported. The prior art mixer housing can pivot from the beater up position to the beater down position. In the past, the weight of the housing unit over the beaters has been sufficient to provide adequate stability to the food mixer during operation.

In these prior art stand mixers, the use of medium power electric motors, for instance in the range of 230 to 240 watts, has been sufficient for most domestic uses. It is well-known that commercial mixers and certain orbiting head stationary bowl mixers are driven by somewhat higher powered electric motors.

The interest of many users of kitchen appliances in making their meals from basic ingredients has resulted in a demand for home food mixers of the rotating turntable variety, which can efficiently mix many foods and knead doughs. The kneading of dough is one of the most difficult tasks which a domestic mixer performs. The necessity of using dough hooks rather than whippers is apparent. However, problems have occurred in the past with commercially available dough hooks in that the dough hooks were sometimes driven so that the mixer head was pulled toward the bowl, thereby causing the dough to climb the dough hooks. If the dough hooks were operated in the reverse direction to prevent dough from rising upwardly along the dough hooks, the mixer head, in consequence, would be forced up and out of the dough, thereby causing the mixer to knead a relatively small portion of the dough. Furthermore, the heavy loads placed upon the conventional mixer could not be met by the medium power motors then available. The center support for the turntable also adds to the instability of the unit, since the off-center loading of the turntable during dough kneading operations is high, thereby introducing mechanical play into the machine.

Accordingly, it would be desirable to have a heavy duty food mixer with a rotating turntable, which can better perform tasks such as dough kneading than prior art food mixers.

SUMMARY OF THE INVENTION

A food mixer particularly useful for heavy duty operation is disclosed herein having a stand and housing and a drive assembly. The food mixer stand has a wide base with a circular inset adapted to receive a peripheral thrust bearing and a high wall circular turntable. The high wall circular turntable provides lateral as well as vertical support for mixing bowls placed thereon. A pyramidal columnar support is formed integral with the base of the stand and tapers to a relatively small rectangular cross section at an upper portion thereof for receipt of the pivot assembly, which in turn pivotally supports the housing and drive unit. A latch mounted in the column of the stand is adapted to hold the housing in either a locked lowered position for mixing operation or a locked raised position for bowl removal and the like. The columnar portion is hollow, defining a channel therein, which opens into a grille in the base. The channel is adapted to receive cooling air flowing from the rear portion of the mixer housing.

The housing contains the drive assembly, which includes a modular drive unit having a heavy duty electric motor. The motor is controlled by a combination mechanical governor and electronic circuit connected to a source of alternating current. The housing is elongated having at one end a bezel provided with a plurality of air slots therein, which permits air to be drawn into the housing when a fan motor is rotated, the air being exhausted through the stand column and out the grille. The bezel is rotatable to allow attachments to be connected to the forward portion of the housing.

A pair of whippers is releasably held in a pair of corresponding sleeves or spindles in the housing in driving connection with the drive assembly. A pair of dough hooks can be substituted for the whippers for the kneading operation. The dough hooks are formed so that upon rotation dough being kneaded is forced downward from the hooks, thereby preventing the dough from rising along the dough hooks toward the housing. The mixing bowls have identical bottom diameters for bowls of different volume. The volume of each of the bowls is thus determined by the respective wall height of the bowl. Each of the bowls curves upward in a slightly concave, somewhat conical configuration. The bowls are nestable for storage.

It is a principal object of the present invention to provide a food mixer having a small amount of mechanical play so that heavy mixing and dough kneading operations can be performed on a rotatable turntable.

A rotating turntable is rotatably mounted on the base on a peripheral thrust bearing. The turntable has a high wall or collar, which snugly receives one of a variety of mixing bowls.

It is a further object of the instant invention to provide an improved food mixer having a motor of sufficient power to perform heavy duty operations.

It is still another object of the instant invention to provide a food mixer having improved mounting means for the drive means to provide for efficient kneading of bread doughs.

Further objects and advantages will become apparent as the following description proceeds and the features of novelty which characterize the invention will be pointed out in the claims annexed to and forming a part of the specification.

BRIEF DESCRIPTION OF THE DRAWINGS

FIG. 1 is a perspective view of a food mixer comprising our invention with the mixing head latched down.

FIG. 2 is a partial sectional view of the food mixer of FIG. 1 taken along line 2—2 having a portion of the stand broken away;

FIG. 3 is a sectional view taken along line 3—3 of FIG. 2 showing details of an ejector mechanism and a forward portion of a drive assembly;

FIG. 4 is a sectional view of a portion of the drive assembly taken along lines 4—4 of FIG. 2;

FIG. 5 is a top view of a housing of the food mixer of FIG. 1 having portions of the housing broken away to show details of the drive assembly mounted therein;

FIG. 6 is a sectional view taken along line 6—6 of FIG. 2 showing details of a speed control mechanism mounted within the housing;

FIG. 7 is a sectional view taken along line 7—7 of FIG. 2 showing further details of the speed control mechanism;

FIG. 8 is an enlarged sectional view taken along line 8—8 of FIG. 2 showing details of a portion of a latch mechanism mounted within a pedestal portion of a stand;

FIG. 10 is a sectional view taken through the pedestal showing details of the latch;

FIG. 15(a) through (d) are front views of the dough hooks in driving engagement with the mixing head showing details of their operative relation;

FIG. 16 is a top view of the dough hooks of FIGS. 15(a)-(d) showing the relative angular relationship of the dough hooks as positioned in the mixing head; and FIG. 17 is a sectional view taken through a shank of a dough hook showing details of a longitudinal retainer spring;

DESCRIPTION OF THE PREFERRED EMBODIMENT

Figure 9:
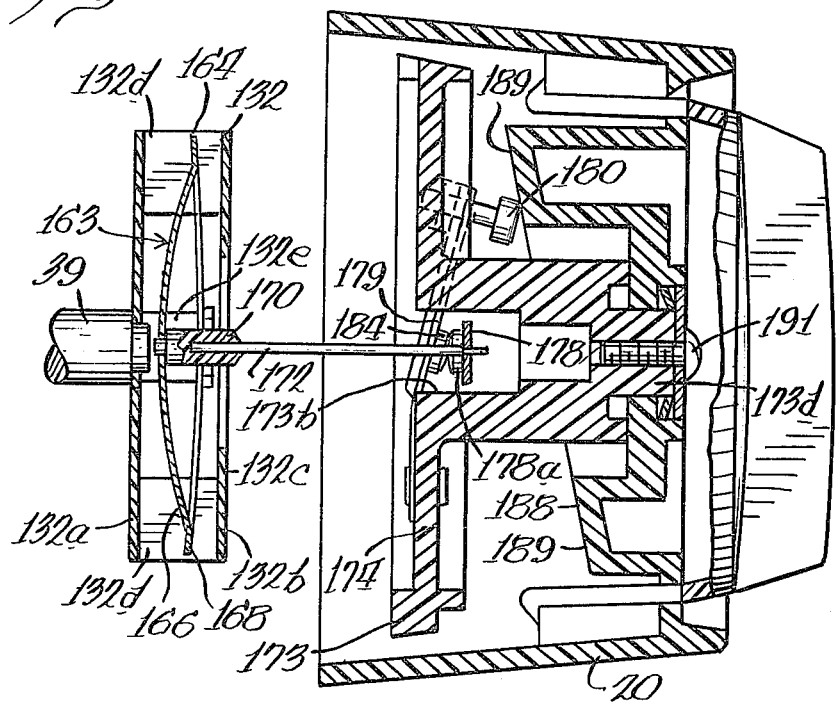
FIG. 9 is a view of the governor and speed control assembly of FIG. 2.

Referring now to FIG. 1 of the drawings, a mixer 10 having a stand 12 with a base 14 and a hollow upright or pedestal 16 formed integral therewith, is generally shown therein. A mixing head 18 is pivotally mounted on upright 16. Mixing head 18 has a generally cylindrical portion 19 and includes a speed control knob 20 mounted at a rear portion 21 thereof. A pair of whippers 22 is releasably mounted in mixer head 18 for rotation thereby. Mixer head 18 also includes an integral handle 24. Handle 24 is hollow and has an upper substantially rectangular plastic pad 26 composed of a vinyl cover having a foam rubber filler positioned on an aluminum backplate and mounted thereon for assistance in gripping the mixer head 18. Handle 24 extends rearwardly from a wall 27, which defines the front face of the mixer head 18 being disposed at the end of cylindrical portion 19 remote from speed control knob 20.

The construction of mixer head 18 can best be seen by referring to FIGS. 1, 2, 3 and 5. The housing for mixer head 18 is defined by an upper plastic housing half 18a and a lower plastic housing half 18b, which abut along a centrally located horizontal plane, as best shown in FIGS. 1 and 3, forming a tubular housing closed at one end by speed control knob 20 and at the other by wall 27. The handle 24 is an integral part of the upper housing half 18a. Mixer head 18 contains a cast aluminum motor module or frame generally indicated by numeral 28 for providing motive power to the whippers 22.

Motor module or frame 28 includes a bottom support section 30 for holding an alternating electrical motor 32. The frame 28 also serves as the means for interconnecting the various parts which define the housing, including upper and lower housing halves 18a and 18b, and the wall 27. As shown in FIG. 7, the upper housing half 18a is formed with a bracket portion 18c, which is secured to frame 28 by screws 29 threadedly received in frame 28. Similarly, the front end of upper housing half 18a is formed with bracket portions 18d, which are secured to the front end of frame 28 by screws 31 threadedly received therein, as shown in FIG. 3. As shown in FIG. 2, the bottom housing half 18b is secured to frame 28 by four screws 33 disposed within the recessed area adjacent the lamp, which will be described below, and which extend upwardly into threaded engagement with frame 28.

The alternating current electrical motor 32, in one constructed embodiment, is rated at 335 watts electrical power. Motor 32 has an armature 34 positioned within motor field 36, the laminations thereof being supported on lengthwise extending ribs 28a on frame 28 and secured to frame 28 by screws 35, as shown in FIG. 5. The armature 34 is electrically connected to a commutator 38 to receive electrical current therefrom. The armature 34 has a shaft end 39 adjacent commutator 38, which is rotatably mounted in a bearing 40. Bearing 40 is secured in a pocket formed in an upright 42 of the motor module 28 by a strap 41. In a somewhat similar fashion, another shaft end 43 of the armature 36 is rotatably mounted in a bearing 44 mounted within a forward yoke 46 of support section 30 of the frame 28.

In order to drive the whippers 22, the armature 34 has a worm gear 48 formed integrally with the armature shaft and positioned forward of bearing 44. Worm gear 48 drivingly engages a pair of helical gears, respectively referred to as 52 and 54, which are separated by a center to center distance of 1.622 inches, to provide rotating motive power to a pair of spindles 56 and 58, upon which helical gears 52 and 54 are respectively mounted. For the purpose of enclosing and supporting the helical gears 52,54 and the spindles 56,58, there is provided a gear housing 45, which is formed by a forward portion 47 of the frame 28 and a gear housing cover 49, as best shown in FIGS. 2 and 4. The portion 47 of the frame 28 has an upwardly facing recess within which the helical gears 52 and 54 are received while the spindles 56 and 58 connected to the helical gears 52 and 54 are supported by elongated sleeves 47a and 47b formed integrally with portion 47, as shown best in FIG. 4.

The gear housing cover 49 abuts the portion 47, as shown in FIGS. 2 and 4, to form an enclosed volume in which the worm gear 48 and the helical gears 52 and 54 are positioned. The cover 49 is secured to portion 47 of frame 28 by the screws 51, as shown in FIG. 5.

Also within the gear housing 45 there is a thrust ball bearing 59, which is mounted on the armature shaft 34 adjacent to the worm gear 48 in abutment with the wall of the gear chamber 45, as shown in FIG. 2, to prevent the torque reaction from gears 52 and 54 from displacing the armature shaft rearwardly.

For the purpose of providing a low speed, high torque drive for accessories, which might be used with the mixer 10, spindle 58 has a spindle worm gear 60 extending upwardly coaxially with gear 54 for rotation therewith to transmit driving power to a helical accessory gear 62, which is drivingly connected to an accessory shaft 64. Adjacent the upper end of the worm gear 60, there is provided an extension 61, which is coaxial with the worm gear 60 and is received in a recess 66 formed in the gear housing cover 49 to journal the extension 61 in a suitable sleeve bearing, as shown in FIG. 4. The accessory shaft 64, which supports gear 62, is received at its inner end in a bearing recess 63 formed in cover 49 while the outer end of shaft 64 is supported in a bearing 65 press fitted into the wall of cover 49, as shown in FIG. 2. Accessory shaft 64 includes a keyway 68 formed therein to receive a mating key from a mixer accessory adapted for driving engagement therewith, but not shown in the drawings. Accessory shaft 64 is positioned concentric with an accessory mounting sleeve 70, which comprises an integral portion of the gear housing cover 45, and which is accessible at the front of the mixer head 18.

A clamping member 74 is threadedly received in the wall of sleeve 70 to provide a holding means, which engages a boss or a suitable mixer accessory. The accessory boss is of suitable diameter to be snugly received in the sleeve where it is engaged by the clamping member 74 as it is threaded inwardly to retain the accessory nonrotatably with respect to the mixer housing while holding a drive shaft for the accessory therein in driving connection with shaft 64.

In order to conceal and protect the accessory sleeve 70 when it is not in use, there is provided a generally circular removable accessory cover 76, which is pivotally connected at its bottom edge to the mixer head 18, as may be best seen in FIGS. 15a and 15b. The cover 76 has a circular center section 77 spaced away from a rim 80 to provide a plurality of air slots 81. This pivotal connection of the cover 76 is achieved through the use of a boss 82, which projects inwardly from the lower edge of cover 76 and which is rotatably received in a bearing 84 formed in the wall 27. The boss 82 and bearing 84 allow the accessory cover 76 to pivot about a lower portion of the forward face of the mixer head 18 between the alternative portions shown in FIGS. 15a and 15b. In order to hold the accessory cover 76 in a closed position, the accessory cover includes a central cylindrical follower 86 formed integral therewith and projecting rearwardly toward the wall 27. Cylindrical follower 86 has a cylindrical depression 88 formed therein, which engages a dimple 90 formed in wall 27 of the mixer head 18, to form a detent to hold accessory cover 76 over accessory mounting sleeve 70 when sleeve 70 is not in use. The front wall 27 is secured to the frame or module 28 by means of screws 96, which threadedly engage the frame 28 and are shown in FIGS. 15b and 2. In addition, the accessory cover can be completely removed from mixing head 18 by withdrawing boss 82 from bearing 84.

As described above, the spindles 56 and 58 are supported by the sleeves 47a and 47b, which have suitable journal bearings 98,99 to receive the spindles. The spindles are driven by helical gears 52 and 54, which in turn are driven by motor 32 through the worm gear 48. Spindles 56 and 58 are formed with coaxial recesses 100 and 101 respectively, which are adapted to removably receive respective shanks 102 and 104 of beaters or whippers 22, as shown in FIGS. 3 and 4. Shank 104 is exemplary of both whipper shanks and includes a snap ring 106 retained in a notch 107 in the shank 104 and engageable with a corresponding annular groove in the wall of recess 101 to hold the whipper 22 in spindle 58.

A manual ejector 108 is provided to eject whippers 22 from spindles 56 and 58. An actuator button 110 extends through a rectangular opening 112 at an upper right hand portion of mixer head 18 for operation to eject the whippers 22. As best shown in FIG. 3, the ejector 108 comprises a somewhat L-shaped lever pivoted to the forward portion of the gear housing cover 49 by means of a shoulder screw or pivotal mounting 118, which is threadedly engaged with cover 49, as shown in FIG. 3. The ejector 108 comprises an upwardly extending arm 114, which supports the button 110 at its end and a generally horizontally extending leg 115. The manual ejector 108 is operated by forcing actuator button 110 downward, thereby causing an arm 114, to which it is connected, to rotate about the pivotal mounting 118 and to move the leg 115, which supports an ejector shoe 120 to cam downward against a Z-shaped ejector member 122, as shown in FIGS. 2 and 3. The ratio of the distances between button 110 and pivot mounting 118 and between the force applying portion of shoe 120 is about 3:1, giving the operator a mechanical advantage of about 3:1 in applying the force to eject the whippers 22. The ejector member 122 is formed with an upper vertical plate portion 122a, an intermediate horizontal portion 122b and a lower cam portion 122c. Member 122 is guided at its upper and lower ends for sliding movement in a vertical direction. As shown in FIGS. 2 and 3, the frame 28 is formed with tabs 123, which are L-shaped and overlie the upper vertical plate portion 122a to guide it for sliding movement against the front wall of frame 28. The lower cam portion 122c of member 122 is received in a slot 125 in the lower housing half 18b to guide the member 122 for vertical movement. Ejector member 122 moves downward against a coiled compression spring 124 when the ejector 108 is depressed. Compression spring 124 engages the inner wall of the lower housing half 18b of the mixer head 18. Ejector member 122 and its cam portion 122c terminate at an edge 128 which engages respective shoulder portions 130 of the whippers 22 and forces them downward out of the spindles 56 and 58. When actuator button 110 is released, spring 124 pushes ejector 122 upward against shoe 120 causing actuator button 110 to move back to its original raised position and moving the ejector 122 to a withdrawn position out of engagement with the whippers 22.

The electric motor 32 is relatively high powered for a mixer of the type disclosed herein and requires good ventilation to keep it and other portions of the drive assembly cool during operation. An axial flow fan 132 is drivingly connected to armature shaft end 39 and positioned rearwardly of bearing 40. Axial flow fan 132, when rotated, draws air in through openings 81 in the accessory cover, which are generally aligned with openings 133 in front wall 27. Cooling air is also drawn through a rectangular slot ventilation grille 134 positioned in the upper housing half 18a as shown in FIG. 2 being opposite opening 112 and of similar dimensions thereto. Cooling air is thereby drawn in through both the front wall 27 and the air grille 134 over the motor module 28 and the motor 32. The axial flow fan 132 is mounted behind the motor 32 to reduce the loading which bearings 44 and 59 receive at the forward portions of the motor module 28. The cooling air drawn in by axial flow fan 132, which is encased in shroud 136, flows downward into the area of hollow pedestal 16. The shroud 136 comprises a semi-cylindrical unit having a first semi-cylindrical wall 136a, which partially encloses the bearing 40, and a second semi-cylindrical wall 136b, which partially surrounds the fan 132, as shown in FIG. 2. The shroud also includes two annular walls 136c and 136d, which lie on either side of the fan 132 and extend inwardly from the second wall 136b to a point slightly closer to the axis of the fan 132 than the outer periphery of the fan. The frame 28 is formed with walls 137 positioned on both sides of the mixer head 18 and forming with the shroud 136 a continuous wall around the fan 132 except for a downwardly facing opening 139 in the frame 28 immediately below the fan 132. The shroud 136 is retained in positions, as shown in FIG. 2, by clamping action between the frame 28 and the upper housing half 18a, there being an annular wall 141 formed on the inner wall of housing half 18a, which registers with and is received in an annular groove in the outer wall of shroud 136, again as shown in FIG. 2.

Pedestal 16 has a generally truncated rectangular crosssection hollow pyramidal shape, which is relatively small in crosssection at an upper portion 138 and is relatively large in crosssection at the lower portion 140 to provide good stability to mixing head 18 while being able to conduct cooling air down through the interior thereof. The cooling air is forced down hollow upright 16 past a latch assembly 142 mounted therein, which will be described in detail later, and exits through an air grille 144 mounted in a bottom 146 of base 14, as may best be seen in FIGS. 11 and 12.

Figure 13:
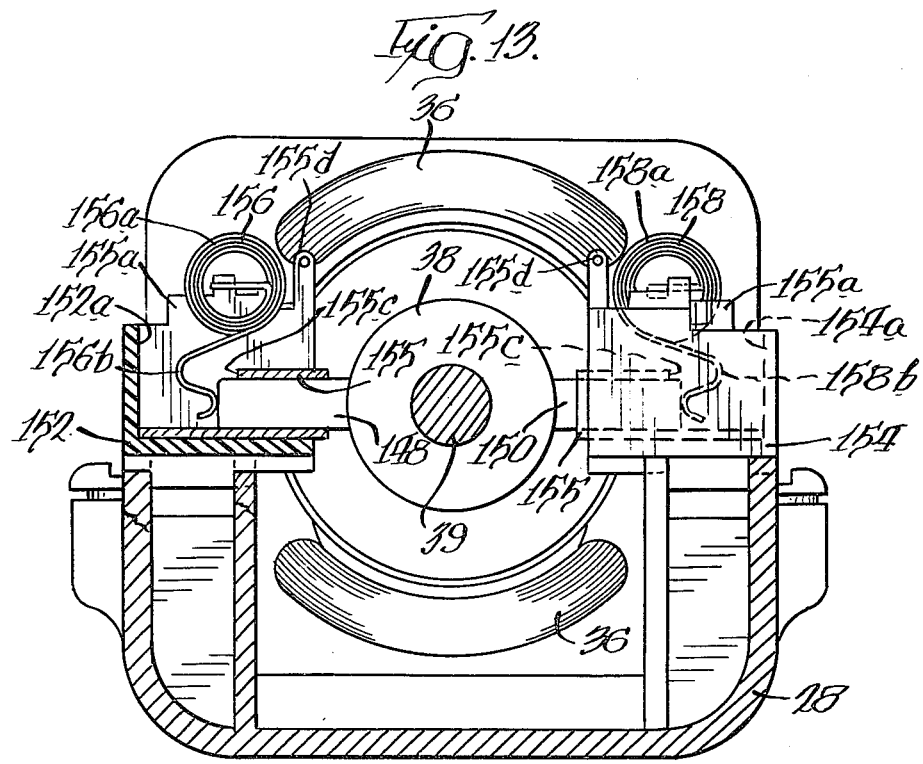
FIG. 13 is a sectional view taken along line 13—13 of FIG. 5 showing details of the brushes and commutation of the electric motor.

Electrical power is supplied to armature 34 of motor 32 through the commutator 38, as may best be seen in FIGS. 5 and 13. Commutator 38 is in electrical connection with a pair of brushes, respectively referred to by numerals 148 and 150. Each of the brushes 148 and 150 is mounted in respective plastic molded brush holders 152 and 154, the brush holders being secured to the frame 28 by screws 153, as shown in FIG. 5. The brush holders 152 and 154 are formed with upwardly and inwardly facing recesses 152a and 154a within which the brushes 148 and 150 are mounted for radial sliding movement with respect to the commutator 38. The actual support for the brushes 148 and 150 takes the form of brass tubes 155, one of which is received in each brush holder 152 and 154, as best shown in FIG. 13. Each tube 155 has an upstanding sidewall 155a, which extends vertically from a tubular portion 155b, which portion has a square cross-section and is adapted to loosely receive one of the carbon brushes as shown in FIG. 13. The top of the tubular portion 155b is cut away at 155c to provide an opening through which the brush biasing spring may extend.

Mounted on the upper edges of the sidewalls 155a of the brass tubes 155 are spiral wound brush biasing springs 156 and 158, which bias the brushes 148 and 150 into engagement with commutator 38. Springs 156 and 158 are substantially identical, having spiral portions 156a and 158a of relatively many turns so that the variation in position of the brushes 148 and 150 due to wear has relatively little effect with respect to the overall length of the springs so as to provide substantially uniform brush force against the commutator 38. The springs 156 and 158 have somewhat S-shaped portions 156b and 158b, which engage the outer ends of brushes 148 and 150. It should also be noted that as the brushes 148 and 150 wear, the S-shaped portions 156b and 158b ultimately engage the wall of the opening 155c in tubular portion 155b so that the springs will not move into shorting engagement with the commutator 38 as brush wear occurs. The brushes 148 and 150 are connected to electrical leads 160 and 162 respectively through the brass tubes 155 rather than through the brush springs 156 and 158 so that electrical current does not flow through the brush bias springs 156 and 158. The leads 160 and 162 connect to the tabs 155d, shown best in FIG. 13. This is particularly important since the brush bias springs 156 and 158 would otherwise have to carry an electric current of several amperes.

The rotational speed at which the motor 32 operates is controlled in part by a mechanical governor 163, which is mounted on the end of the armature shaft within or in close proximity to the fan 132, as shown in FIG. 9. The governor 163 includes a radially extending centrifugal member 164 having a relatively curved spring portion 166 and a relatively flat stiff portion 168. The fan 132 is formed by an apertured plate portion 132a, which is secured to a molded plastic member 132b, having a wide annular wall 132c and a plurality of radial fan blades 132d. The plate portion 132a is formed with two spaced parallel rearwardly extending legs 132e for supporting the member 164, as shown in FIG. 9. The legs 132e (one of which is shown in FIG. 9) straddle the portion 166 and at their ends support the spaced legs of the portion 168. A plastic connector 170 is secured to the center of relatively curved spring portion 166 for movement substantially perpendicular to a plane of rotation of axial flow fan 132 and an actuating rod 172 is connected thereto.

In order to support the electrical components controlled by the governor 163, there is provided a generally circular molded component base 173, which is disposed in spaced parallel relation to the fan 132. The base 173 is secured to the frame 28 by means of two forwardly extending mounting tabs 173a which are clamped between the upper housing half 18a and the frame 28 by screws 29, as shown in FIG. 7.

Mounted on the base 173 is an electronic circuit module 174, which is employed to suppress electromagnetic interference and prevent motor cogging at low speeds. The base 173 is formed with a recess 173b within which a flexible contact supporting arm 178 is supported, as shown in FIGS. 7 and 9. A rivet 175, which secures the module 174 to base 173, also secures one end of the arm 178 to base 173 with the other end supporting a contact 178a. The arm 178 and its associated contact 178a are movable in response to the axial movement of actuating rod 172, the end of rod 172 having a reduced diameter portion engaged in an opening in the middle of arm 178, as shown in FIGS. 7 and 9.

A second flexible contact supporting blade or arm 179 is secured to base 173 in an opening 173c by a rivet 176, which also secures the module 174 to base 173. The arm 179 has a contact 184 mounted at its midpoint for engagement with the contact 178a on the arm 178. A machine screw 180 is threaded through the unsupported end of blade 179 opposite the portion which receives actuator rod 172 for factory adjustment of the speed or power of the mixer. Actuator rod 172 moves arm 178 rearward as the rotational velocity of curved spring portion 166 increases. At a selected speed represented by a determined amount of rearward movement of arm 178, contacts 184, 178a open thereby providing a partial turn-off signal to a control circuit 186 mounted on base 173.

The speed of motor 32 is selected by the rotational position of cap 20 through the agency of a ring cam 188 having a cam surface 189. The base 173 supports the cap or speed control 20 on a rearwardly extending boss 173d, the cap being secured by a retaining screw 191, which permits the cap to rotate with respect to the base 173. As the cap 20 is rotated, the cam surface 189 engages machine screw 180 and deflects the blade 179 to position the contact 184 in accordance with the speed setting of the cap 20. As speed control cap 20 is rotated to a higher speed setting, the cam surface 189 in engagement with the machine screw 180 permits the screw 180 to move rearwardly under spring bias produced by blade 179 thereby displacing the contact 184 rearwardly so that a progressively greater rearward movement of actuator arm 172 is required to open the contacts and therefore a progressively higher rotational speed of the motor 32 is achieved before the contacts 184,178a open.

Figure 14:
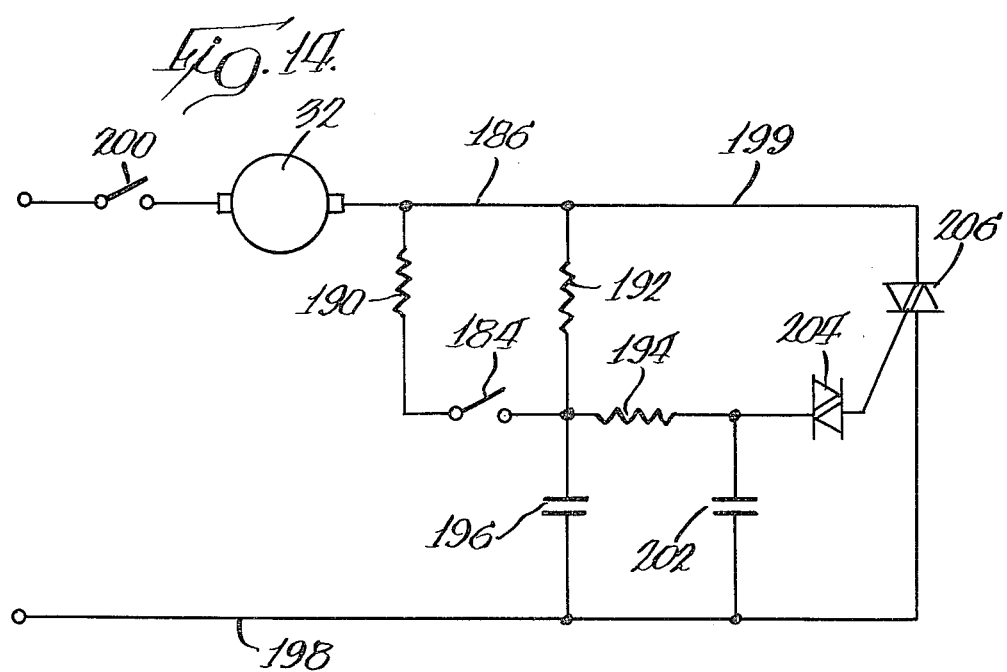
FIG. 14 is a schematic diagram of the electronic speed control circuit.

The electronic circuit 186 of which contacts 184,178a comprise a portion is also shown in the schematic diagram of FIG. 14. A similar control circuit is disclosed in patent application Ser. No. 916,189, abandoned, which is also owned by the assignee. Governor contacts 184 and 178a are respectively connected to a 4.7 kilohm resistor 190 and the junction of a 47 kilohm resistor 192, at 15 kilohm resistor 194 and 0.1 microfarad 200 volt capacitor 196. Although in the instant embodiment resistor 190 has a resistance of 4.7 kilohms. the resistance can vary from 2.2 kilohms to 12 kilohms. Capacitor 196 is connected to a lead 198 which is connectable to a source of alternating current. Resistor 190 is connected to motor 32, which is in turn connected through a main on-off switch 200 to the source of alternating current. A 0.1 microfarad 200 volt capacitor 202 is connected to a resistor 194 in parallel with capacitor 196. A diac 204 is connected to the junction of a resistor 194 and capacitor 202. The triac 206 is connected through its gate to diac 204 and through its main terminals to lead 198 and lead 199. Main switch 200 is selectively actuated by shoulder 208 formed integral with the interior of cap 20.

When main switch 200 is initially closed, the governor contacts 184 and 178a are positioned to be in contact. Resistors 190 and 192 are both connected to capacitor 196 to charge it relatively rapidly. When capacitor 196 charges, capacitor 202 is also charged through resistor 194 causing diac 204 to receive a potential exceeding its breakdown voltage, thereby switching triac 206 on to conduct electric current through motor 32.

As soon as the alternating current reverses polarity at the following half cycle, capacitors 196 and 202 are discharged and triac 206 shuts off thereby returning the circuit to its original nonconducting state and allowing the capacitors 196 and 202 to charge from opposite plurality current and thereby switching triac 206 on for a portion of the opposite triac cycle. Triac 206 is thus switched on for a selected portion of each half cycle of alternating current and switched off at each zero crossing thereby eliminating electromagnetic interference when the triac switches off.

When the motor exceeds its preselected limit as determined by the mechanical governor, governor contacts 184 open, causing capacitors 196 and 202 to be charged relatively more slowly through resistor 192. This causes the triac 206 to switch on later in each half cycle of alternating current and effectively reduces the average amount of power received by the motor. The motor 32, nevertheless, is supplied with a preselected minimum amount of power at all times to prevent low speed cogging. Opening and closing of the governor contacts 184 and 178a produce very little, if any, electromagnetic interference since only a relatively small amount of current is flowing thereacross in contrast to the large motor current controlled by the triac 206. This motor control circuit is of particular advantage in a mixer such as is disclosed herein, which consumes a relatively large amount of electrical power since the control circuit dissipates very little energy. In many of the prior art units a variable resistor having approximately a 200 ohm resistance was employed in conjunction with a mechanical governor for controlling motor speed. Of necessity, the resistance dissipated a relatively large amount of heat into the interior of the mixer head. The instant food mixer does not have that wasteful energy loss.

For the purpose of providing good illumination in the work area of the mixer and to illuminate the contents of the bowls being mixed, there is provided a socket 210 for an incandescent lamp 212, which is electrically connected to the control circuit. The conventional incandescent lamp 212 is fitted in the socket 210 to be energized by an electric current. Socket 210 is secured by a rivet or other suitable means to an extension 214 on module 28. Socket 210 is directly connected to the power cord 197 so that the incandescent lamp 212 remains lit regardless of whether the motor switch 200 is on or off as long as the mixer is plugged in and is receiving AC power. A frosted lens 216 having a rear tongue 218 and a front tongue 220 is mounted within the opening 213 below and in an enclosing attitude with the incandescent lamp 212. Rear tongue 218 engages a shoulder 221 on the lower housing half 18b. Front tongue 220 is seated in a recess 222 in the lower housing half 18b and is secured thereto by a small self-tapping screw 223. The frosted lens 216 diffuses light from the incandescent lamp 212 to provide uniform lighting to the area of the whippers 22.

Oftentimes when mixers are used to mix dough, if the dough hooks are rotated in a first selected direction, the dough has a tendency to rise up the spindles of the dough hooks and adhere to other portions of the mixer head thereby causing difficulty in cleaning up and possibly damaging portions of the mixer head. Should the dough hooks be rotated in an opposite direction to force the dough downward away from the dough hooks, the reactive force has a tendency to lift the mixer head away from the bowl and reduce the efficiency of mixing and kneading. This is a problem which becomes more severe as the amount of dough to be kneaded increases and as the amount of power or torque available to the dough hooks is likewise increased.

In order to overcome the mixing head lifting problem, the locking latch 142 is provided and is mounted within upper portion 138 of the pedestal 16. In order to change whippers or bowls, it is necessary to be able to move mixing head 18 away from the portion of the base approximate the turntable. It is conventional to provide for a pivot means between the mixing head and the base or pedestal of conventional mixers.

In the instant embodiment, latch means 142 also includes pivot means positioned between the pedestal 16 and the mixing head 18 to allow the mixing head 18 to be raised out of operative engagement with a mixing bowl. In order to provide a rigid connection between head 18 and the pivot means, bottom support section 30 has a pivot arm 224 formed integral therewith. Pivot arm 224 is secured in pivoting connection by a pin 226, a mounting member 225, which is positioned within and secured to pedestal 16. A latch arm or lever 227, which is pivotally connected to mounting member 225 by a pin 228 serves to secure mixing head 18 positively in either its fully raised or fully lowered position but allows mixing head 18 to pivot freely therebetween.

Pivot arm 224, as may best be seen in FIGS. 2, 8, 10, and 12, has a substantially rectangular U-shaped horizontal cross-section, a pair of opposed pivot arm ears 230 are formed with apertures 231 to receive pin 226. An upper lock pin 232 and a lower lock pin 233 are mounted in bridging connection between ears 230 and are parallel to and equidistant from the pin 226. Pins 232 and 233 are fixed with respect to ears 230. The pivot arm 224 includes a center wall 231a formed integrally with and positioned between ears 230. Center wall 231a comprises a flat plate. Center wall 231a receives an adjustment bolt 239 and nut 240. Mounting member 225 provides pivotal support for mixer head 18 and is secured to pedestal 16 by a pair of bolts 234. Bolts 234 threadedly engage a horizontal shoulder 235 of pedestal 16 to hold a pair of ears 236 against shoulder 235. Ears 236 are formed integral with and perpendicular to an abutment plate 238 on opposite sides thereof. Bolt 239 is adjusted so that when bolt 239 contacts abutment plate 238, downward rotation of mixing head 18 past a preselected position is prevented.

Figure 12:
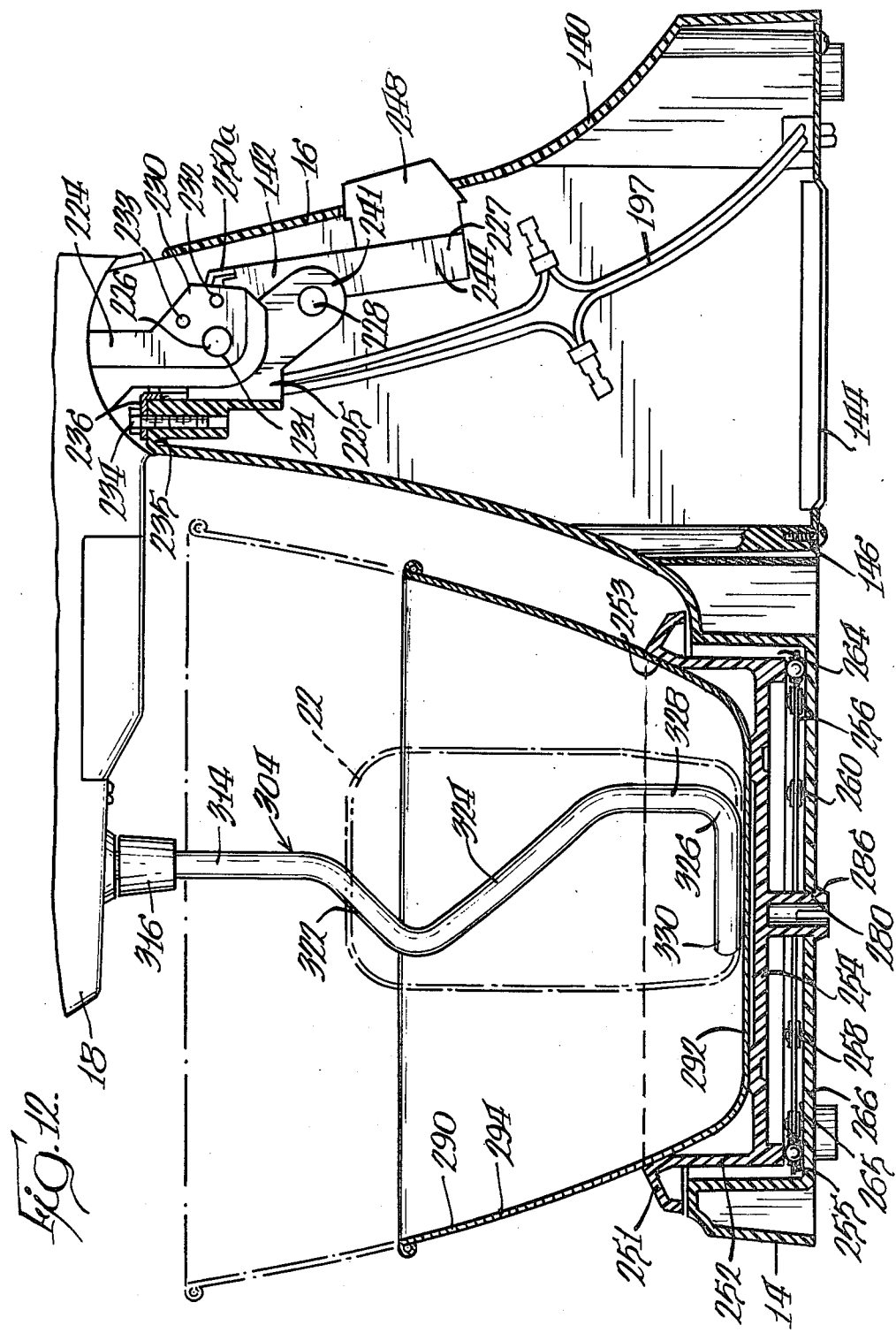
FIG. 12 is a sectional view of the mixer stand in operative relationship with a small mixing bowl and inboard dough hook; a whipper and a large mixing bowl are shown in phantom view.

A pair of latch arm ears 241 extend downward and away from the abutment plate 238 and are perforated to receive pin 228. A coil spring 242 is mounted on pin 228 in biasing engagement with mixer head pivot pin 226 and latch lever arm 227. Spring 242, as shown in FIGS. 2, 10 and 12, urges arm 227 in a counterclockwise direction. Arm 227 has a U-shaped rectangular cross-section having a pair of side walls 244 formed integral with a center connecting wall 245.

A rectangular aperture 246 is formed in connecting wall 245 for receipt of a prismatic thumb actuation button 248. Thumb actuation button 248 extends through a rectangular aperture 249 in the rear wall of the pedestal 16.

Side walls 244 of the latch lever 227 terminate at a pair of inwardly folded tabs 250, one of which is shown in FIGS. 2 and 10. Center wall 245 terminates at an angled finger portion 250a extending above the tabs 250 so that the tabs 250 and the finger portion 250a define a fork or positive engagement means for pins 232 and 233 with the pins being straddled by the tabs 250 and the finger portion 250a, as shown in the alternative positions in FIGS. 2 and 10.

When mixing head 18 is positioned in its operative or fully lowered position, as shown in FIGS. 2 and 12, latch arm 227 engages lower pin 232 to prevent rotation of pivot arm 224 with respect to mounting member 225. Mixer head 18 is unlocked by applying pressure to actuation button 248 to rotate latch lever against the bias of spring 242 thereby releasing lower pin 232. Mixer head 18 can then be rotated and latch lever arm 227 can be released, since lower pin 232 cams along the latch arm tabs 250. As the mixer head 18 is further raised, pin 233 engages the finger portion 250a and cams along the finger portion 250a until the mixer head 18 reaches its fully raised position and upper pin 233 is oriented between the finger portion 250a and tabs 250 along latch arm 227. Thus, it can be appreciated that the locking latch 142 securely locks the mixing head 18 in either the raised or the lowered positions. Actuation of the latch arm 227 unlocks the mixer head 18, at which time the mixer head 18 can be pivoted freely without further actuation of latch arm 227.

Referring now to FIG. 12, there is shown a recessed wall turntable 251 having a relatively high vertical sidewall 252 with a bowl engaging bevel 253 and a circular floor 254 formed integral therewith for receipt of a bowl. Turntable 251 is rotatably mounted on a peripheral thrust bearing 255, which includes a flexible plastic ring section 256, having a plurality of ball retaining sleeves 258 formed at regular intervals thereabout. Each of the ball retaining sleeves 258 has a ball 260 seated therein, but free to rotate within the sleeve 258. Peripheral thrust bearing 255 is positioned in a race 265 of a turntable well 264 of base 14.

Figure 11:
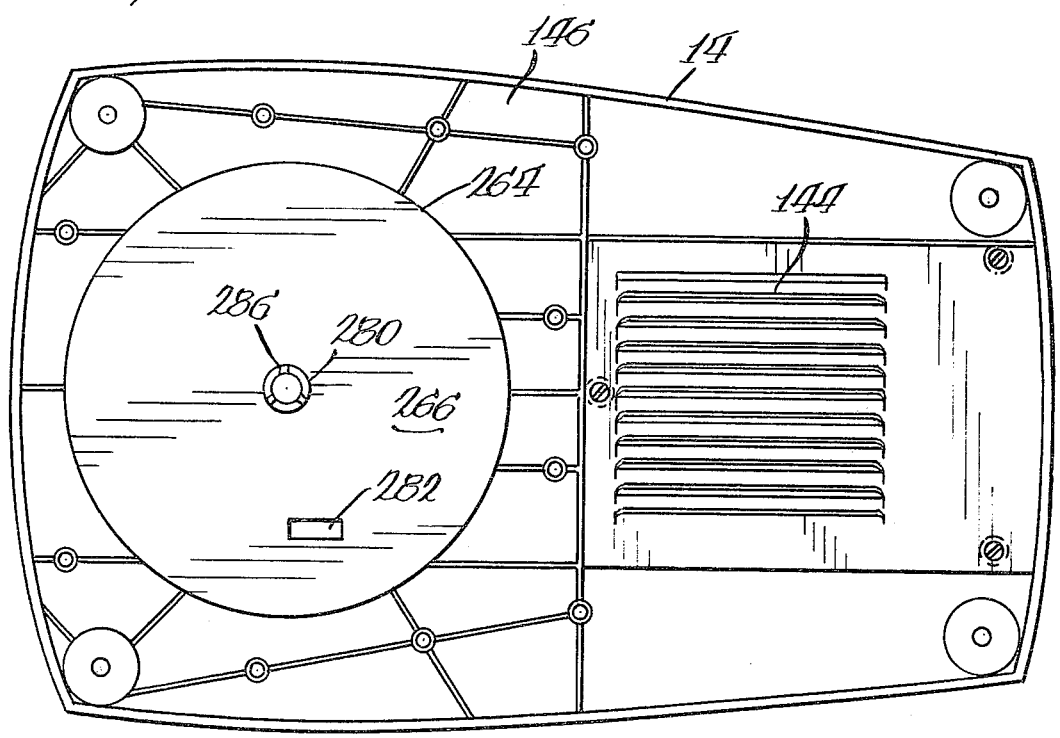
FIG. 11 is a bottom view of the base of the mixer stand.

A floor portion 266 of the well 264 has a centrally located aperture 280 for receiving the turntable pin and a rectangular drain 282 formed therein, as shown in FIG. 11. The central aperture 280 receives a slotted sleeve 286 formed integral with turntable 251 to hold turntable 251 in engagement with peripheral thrust bearing 255. The sleeve 286 has radially extending projections on its lower end; these projections are deflected inwardly on assembly and thereafter engage the lower face of the bottom of base 14 to retain the turntable assembled thereto. Unlike prior art mixer turntables, which are supported only by a center bearing, turntable 251 is supported by peripheral thrust bearing 255 to provide good stability during high loading operations, such as dough mixing and kneading.

The bowl engaging bevel 253 of turntable 251 receives a bowl 290 having a diameter substantially equal to the diameter of floor 254 of the turntable. Bowl 290 fits snugly against bevel 253 to provide good stability and support to the bowl 290. In this way, an extremely stable but rotatable platform is provided by the combination deep well turntable, peripheral thrust bearing, and snugly fitted bowl.

In order to have bowls having several volumes while maintaining good stability in the inventive rotatable turntable mixer, each of the bowls 290, regardless of its volume, has the same diameter bowl floor 292 and the same contour adjacent the bowl floor. Each of the bowls 290 sweep upward and have side walls 294, which are substantially conical with a slightly convex curvature. Thus, the volume of each bowl is substantially determined by the height of the side wall of the bowl. This is unlike the practice associated with prior art rotatable turntable mixers wherein the bowl volume was varied by varying both the bowl floor diameter and the bowl depth. In this case, whether the bowl is composed of stainless steel or glass is immaterial. A further advantage of the use of the inventive bowls 290 can be appreciated, since even a large bowl having a relatively small amount of ingredients placed therein elevates the ingredients to provide thorough mixing since the base diameter of the bowl is relatively small.

One of the advantages of the instant turntable arrangement lies in the fact that the peripheral bearing 255 is positioned immediately beneath either the driving whipper 22 or the outboard dough hook, which will later be described in detail, so that the bearing 255 provides high stability when loaded from either the whippers 22 or the dough hooks. The tapering bowl 290 allows the driving whipper to be positioned in proximity with the wall 294 of the bowl 290 to provide wiping action therefor, regardless of the bowl volume, without having to shift the relative positions of the turntable 251 and the mixing head 18 to accommodate varying bowl sizes, as is often required in the prior art food mixers.

The latch 142 and the turntable 251 are particularly important to the stability of mixer 10 when dough kneading operations are performed. A pair of dough hooks or dough kneading elements 300 comprising an outboard dough hook 302, and inboard dough hook 304, is removably mountable within spindle sleeves 56 and 58 for dough kneading operations. Outboard dough hook 302 has an upper shank section 306, and a collar 307, which are formed integral with a helix positioning arm 308. Helix positioning arm 308 is positioned at a 50° angle with respect to the axis of the upper shank section 306. The dough hook 302 is further provided with a helix 310 having a lead of 2.5 inches and 180° rotation with a 1.5 inches pitch diameter and an outer diameter of 1.810 inches is formed integral with helix arm 308. A wiper arm 312 is formed integral with the lower end of helix 310.

The inboard dough hook 304 likewise has an upper shank section 314, having a length identical to the length of shank 306, and is formed integral with a collar 316 and a helix positioning arm 322 positioned at an angle of 50° with respect to the shank 314. A helix 324 is formed integral with helix positioning arm 322 and is wound in a direction opposite to helix 310. Helix 324 has a lead of 2.5 inches and 180° revolution with a 1.5 inches pitch diameter and an outer diameter of 1.810 inches. Helix 324 terminates at an integral right angle with mixing foot 326, which has a vertical portion 328 and a horizontal mixer portion 330. Horizontal portion 330 has a length substantially equal to the diameter of the helix 324.

The helices 310, 324 of the dough kneading elements are allochiral, or mirror images of one another. This is necessary since the dough kneading elements 300 are counter-rotating elements. Since the center to center distance between helical gears 52 and 54 is 1.622 inches and the spindles 56 and 58 are separated by the same amount, the helices 310 and 324 overlap since their outer diameters are 1.810 inches. When the helix positioning arm 322 lies in a plane defined by reference line 331, which is coplanar with shank sections 306 and 314, and points toward shank 306, helix positioning arm 308 is oriented at an angle of 61° to 67° with respect to the plane. This allows sufficient separation between the helices of the dough kneading elements to prevent jamming while providing for efficient kneading of dough.

The inboard dough hook, because of its relatively long mixing foot, experiences large torsional stresses along its shank. The conventional split ring spring arrangement employed on whippers 22 and dough kneading element 302 cannot be used for dough kneading element 304. The circular slot thereby required reduces the effective cross-section of the shank to the point where fracturing occurs.

In order to provide a spring retainer means, which does not weaken the shank to the extent of a split ring spring, a longitudinal spring means 340 is provided, as may best be seen in FIG. 17. A longitudinal slot 342 extends from the end of a shank 341 to a collar 341a. As the slot 342 approaches the collar 316 it narrows at portion 343 as the floor tapers upward. A wire spring 344 is staked therein. The wire spring 344 has a substantially straight section 346 with a convex hook 348 formed thereon. The convex hook 348 has an upper face 350, which is adapted to cam into biasing relation with the mixer head spindle to hold the shank within the spindle. It can be appreciated that the single longitudinal slot 342 reduces the effective cross-sectional area of the shank to a lesser degree than does the conventional split ring slot, thus providing for a high strength shank.

In use, dough hooks 302 and 304 are removably fitted within spindles 56 and 58 so that at the beginning of one complete revolution of the spinldes, a relative minimum distance is located at an upper portion of the helices 310 and 324 and the lower portions of the helices 310 and 324 define a relatively wide opening into which dough can easily flow. As the dough hooks 300 counter-rotate, outboard dough hook 302 follows inboard dough hook 304 and the helical positioning arms are rotated away from each other causing dough engaged thereby to be pulled apart and kneaded while the minimum distance between the overlapping helices moves downward. Thus, the upper portions of the dough hooks 300 knead the dough by drawing it apart while the middle portion squeezes the dough downward between the hooks thereby providing a resultant force tending to lift the head, which is prevented by latch 142. Further rotation causes the minimum distance between the helices 310 and 324 to move lower until the upper portion of the helices are positioned relatively far apart and the lower portion of the helices are positioned close together. Thus, the dough hooks 300 knead the dough by simultaneously drawing and squeezing it while forcing it down into the bowl where it is being kneaded. Rotation of the outboard hook 302 keeps the wiper arm 312 and the other portions of the dough hook 302 in proximity with the wall 294 of the bowl 290 at various times during the rotating cycle, thereby pulling the dough away from the wall 294 of the bowl 290 and keeping it in the center of the bowl. The dough hook foot 326 is of particular advantage at the beginning of a dough mixing operation since the horizontally positioned foot 330 contributes to a large extent to the mixing of the dough until it reaches a glutinous consistency when the helices 310 and 324 begin kneading it.

In order to provide a stable structure for high load mechanical operation of the mixer such as dough kneading, the base of the mixer is relatively wide and long as compared to the housing and is in proportion substantially wider and longer than bases of comparable prior art equipment.

It may be appreciated that the mixer 10 disclosed herein provides a number of advantages over the mixers described and disclosed in the prior art. While the prior art teaches fixed base mixers with orbiting mixing heads, which are relatively high powered, there does not appear to be a teaching of a high power rotatable turntable mixer which can efficiently knead dough. The deep recessed turntable 251 supported by the peripheral bearing 255 provides extremely good mixing stability. The dough hooks 300, with their single helices 310 and 324, efficiently knead the dough through a combination of pulling and pushing while continuously forcing the dough downward. The mixing head 18 is fixed with respect to the stand by the latch assembly 142. The uniform base diameter bowls 290 snugly engage the turntable 251 and further provide the advantage that small amounts of material can be efficiently mixed even in large volume bowls, in that small amounts of material are not distributed in a shallow layer extending across the bottom of the bowl.

The ventilation of the mixer allows air to be drawn in through the forward portion and exhausts all of the air through the base 14 of the stand 12 away from the area of the turntable 251 and provides low restriction lateral air flow through the mixing head 18 for efficient cooling. The combination of the mechanical governor 163 and the electronic control circuit 186 provides an energy efficient control system, which reduces heat build up in the mixing head 18 during operation.

While there has been shown and described a specified embodiment of the present invention, it will be apparent to those skilled in the art that various changes and modifications may be made without departing from the invention in its broadest aspects, and it is, therefore, contemplated in the appended claims to cover all such changes and modifications as fall within the true spirit and scope of the present invention.

What is claimed as new and desired to be secured by Letters Patent of the United States is:

1. A food mixer comprising a stand having a base with a hollow upstanding pedestal portion, a rotatable turntable seated on a peripheral thrust bearing in a rotational mounting attitude with the base, said rotatable turntable having a circular floor and an upstanding side wall adapted to engage snugly a mixing bowl removably seated therein, a mixer head supported on said pedestal for movement between a lowered operative position in which mixing elements driven by said head are received in said mixing bowl and a retracted position in which said mixing elements are raised above said bowl, a latch mounted in an upper portion of the hollow pedestal portion and including a latch lever pivotally connected to said pedestal, means cooperating with said latch lever to lock said mixer head against pivotal movement in either said retracted or operative position.

2. The food mixer of claim 1 wherein the power head mount means includes a pair of vertically spaced horizontally disposed lock pins for locking engagement with said latch lever to hold said power head locked in either the fully lowered locked position or the fully raised locked position.

3. The food mixer of claim 2 wherein said latch lever is characterized by a locking fork which is selectively engageable with one or the other of said pair of lock pins when the mixing head is either in its fully raised or fully lowered positions.

4. A food mixer as defined in claim 3 wherein said latch lever fork undergoes smooth cammed movement against said lock pins when said power head is positioned between the fully raised and fully lowered positions to allow the power head to be moved without the necessity of holding the latch lever during the full movement of said power head.

5. A food mixer as defined in claim 4 wherein said mixer head has a pair of dough hooks removably mounted therein for kneading bread dough contained in a mixing bowl snugly received by said rotatable turntable.

6. A food mixer as defined in claim 5 wherein said mixing bowl has a base bottom diameter slightly less than the floor diameter of the rotatable turntable so that a side wall of said mixing bowl is snugly engaged by a beveled surface of the generally vertical turntable wall to effectively stabilize said bowl when dough is being kneaded therein.

7. A food mixer as defined in claim 1 including means for generating an axial air flow rearwardly through said power head and downwardly through said hollow pedestal with said air being exhausted through the base of the stand.

8. A food mixer as defined in claim 7 wherein said stand has an air exhaust grille mounted beneath said base in communication with said hollow pedestal.

9. In a food mixer for mixing foodstuffs and kneading dough having a stand with a mixing head mounted thereon, a pair of dough hooks mounted in said mixing head characterized by each dough hook having a single interacting helical portion, said interacting helical portions defining a preselected minimal distance therebetween during a driving cycle, said preselected minimal distance initially being disposed at an upper portion of said helical portions while a maximum distance between the helical portions is disposed therebelow to allow a quantity of dough to enter a space between the dough hooks, said preselected minimal distance moving downward as the dough hooks are rotated during the driving cycle thereby causing compressional kneading of the dough and forcing the dough downwardly away from the mixing head while the upper portions of the helices progressively separate to knead the dough by pulling and stretching it as the minimal disposition travels downward.

10. In a food mixer for mixing foodstuffs and kneading dough as defined in claim 9 wherein said interacting helical portions of said dough hooks are allochiral.

11. In a food mixer for mixing foodstuffs and kneading dough as defined in claim 10 wherein the dough kneading elements include an inboard dough hook and an outboard dough hook, the inboard dough hook wiper arm formed integral with the helix shank, the wiper arm being disposed substantially parallel to a tangent taken along a portion of a bowl side wall closest to the wiper arm so that the wiper arm can move the dough from the outside of the mixing area to the interior of the mixing area.

12. In a food mixer for mixing foodstuffs and kneading dough as defined in claim 11 wherein the inboard dough hook has a mixing foot formed integral with the helix shank, the mixing foot being disposed in a normal attitude to the shank so that rotation of the inboard dough hook provides substantial mixing of the dough and ingredients in the mixing bowl.

13. A food mixer for mixing foodstuffs and kneading dough as defined in claim 10 wherein the dough kneading elements each include a helix positioning arm which is oriented in a relative rotational separation with the other helix arm sufficient to allow close operating proximity between the helices for efficient dough kneading without jamming the dough kneading elements.

14. A food mixer for mixing foodstuffs and kneading dough as defined in claim 10 wherein the dough kneading elements each include a helix positioning arm, which is oriented in a relative rotational attitude of between 61° and 67° separation when said dough kneading elements are mounted in a mixer and are oriented so that the inboard dough hook positioning is oriented toward the outboard dough hook.

15. A pair of dough hooks for use with a food mixer to mix and knead dough comprising an interacting single helical portion of each dough hook, said dough hooks being adapted to be disposed in a preselected relative rotational orientation so that said respective interacting helical portions define a preselected minimal distance therebetween in one rotational position thereof, said preselected minimal distance being disposed at an upper portion of said dough hooks at the beginning of a driving cycle while a maximum distance between the helical portions is simultaneously spaced therebelow to allow a quantity of dough to enter the space between the dough hooks, said preselected minimal distance moving downward as the dough hooks are rotated thereby compressionally kneading the dough and forcing it downwardly away from the upper helical portions while said upper helical portions progressively separate to knead the dough by pulling and stretching it as said minimal distance travels downwardly during each complete revolution of said pair of dough hooks.

16. A food mixer for mixing foodstuffs and kneading dough comprising a pair of dough hooks each having an interacting single helical portion, said dough hooks including an inboard dough hook and an outboard dough hook, the outboard dough hook being characterized by a wiper arm formed integral with but spaced below said helix portion, the wiper arm being disposed at a downward and inward angle substantially parallel to a tangent in a vertical plane taken along a portion of a bowl side wall closest to the wiper arm so that the wiper arm can move dough from the outside of a mixing area of a bowl to the interior of the mixing area, said dough hooks being adapted to be disposed in a preselected relative rotational orientation so that said respective interacting helical portions define a preselected minimal distance therebetween in one rotational position thereof, said preselected minimal distance being disposed at an upper portion of said dough hooks at the beginning of a driving cycle while a maximum distance between the helical portion is simultaneously spaced therebelow to allow a quantity of dough to enter the space between the dough hooks, said preselected minimal distance moving downward as the dough hooks are rotated thereby compressionally kneading the dough and forcing it downwardly away from the upper helical portions while said upper helical portions progressively separate to knead the dough by pulling and stretching it as said minimal distance travels downwardly during each complete revolution of said pair of dough hooks.

17. A food mixer for mixing foodstuffs and kneading dough as defined in claim 16 wherein the inboard dough hook has a mixing foot formed integral with the helix but spaced below said portion, said mixing foot being disposed in a normal attitude to the shank so that rotation of the inboard dough hook provides substantial mixing of the dough and ingredients in the mixing bowl.

18. A food mixer for mixing foodstuffs and kneading dough as defined in claim 17 wherein the helical portions of the dough hooks when the hooks are mounted in the mixer are positioned in a relative rotational attitude of between 61° and 67° separation in a horizontal plane when one of said dough hooks has a helix positioning arm directed toward said other dough hook.

19. A dough hook for kneading dough comprising a spindle having a single helical portion connected thereto, a wiper arm connected to the helical portion and oriented at an acute angle with respect to said spindle, said wiper arm being adapted to be disposed in proximity with a side wall of a bowl containing dough to be kneaded so that said wiper arm when rotated mixes and kneads the dough positioned in the bowl adjacent the wall thereof.

20. In a food mixer having a stand with a hollow upright portion and a mixing head mounted thereon, a drive motor mounted within the head and having a cooling fan operable thereby, a cooling system characterized by an air inlet opening positioned at a forward portion of said mixing head whereby cooling air is drawn through said opening into said head, air passage means between a rearward portion of said mixing head and said hollow upright portion of said stand whereby said cooling air passes out of said head and downwardly through said upright portion of said stand and outwardly through an air outlet provided in the bottom of said stand.

21. A food mixer having a stand with a mixing head mounted thereon as defined in claim 20 wherein a first plurality of air inlet openings are provided on a forward face of the mixer housing and a second plurality of cooling air inlet openings are provided at an upper side wall of the mixer head adjacent the forward end thereof.

22. A food mixer having a stand with a mixing head mounted thereon as defined in claim 21 wherein said upright portion of said stand comprises a hollow pedestal which is open at its upper end and which has an air outlet grille mounted on the bottom thereof.

23. A food mixer comprising a stand having a pedestal with a spring loaded latch mounted thereon, said latch having a return spring biased lever arm for locking connection with either of a pair of lock members connected to a mixing head pivotally mounted on said pedestal, said lever arm positively engaging one of said lock members when a mixer head is disposed in a lowered position thereby pivotally locking the head to said pedestal in a lowered operative attitude, said lever arm positively engaging the other lock member when said mixer head is disposed in a raised position, thereby positively locking the mixer head in said raised attitude.

24. A food mixer as defined in claim 23 wherein each of said lock members comprises a horizontally disposed pin vertically separated from the other lock members which are respectively lockingly engaged by a latch fork of the latch lever when mixing head is positioned either in the lowered operative attitude or in a raised position located at the upward extent of mixing head travel, and which are in camming engagement with said latch fork when said mixing head is being moved between the lowered operative position and the raised locked position.

25. A food mixer comprising a stand having a pedestal with a mixer head pivotally mounted thereon, said pedestal and said mixer head being connected by a pivotal latch adapted for locking said mixer head to said pedestal, a pair of food processing elements drivingly connected to said mixer head for rotation thereby and extending into a food receiving bowl positioned on said stand, said food processing element having helical portions which are rotated in a direction to cause the food being processed to be forced downwardly with respect to said food processing element away from said mixer head thereby causing an upward force tending to pivot said mixer head around its pivotal mounting on said pedestal.

26. A food mixer as defined in claim 25 wherein each of said lock members comprises a horizontally disposed pin vertically separated from the other lock members, which are respectively lockingly engaged by a latch fork on the latch lever when said mixing head is positioned either in the lowered operative attitude or in a raised position located at the upward extent of mixing head travel, and which are in camming engagement with said latch fork when said mixing head is being moved between the lowered operative position and the raised locked position.

27. A food mixer comprising a mixing head having a pair of spindles adapted in receipt of a pair of food processing elements, an alternating current electric motor in said mixing head drivingly connected to rotate said spindles, an axial flow cooling fan in driving connection with said motor, said fan cooling air through a forward portion of said mixing head and exhausting the cooling air into a hollow pedestal of a stand, said mixing head having a yoke which is in pivotal engagement with a pedestal mount for a latch, said mixing head having a pair of horizontally disposed spaced lock pins adapted for engagement with a latch fork of a latch lever pivotally mounted on a pedestal mounting means, said latch fork being adapted to engage a respective one of said lock pins when said mixing head is either in a fully raised or fully lowered operative attitude and being adapted to cam on said lock pins when said mixing head is positioned between the fully raised position and the lowered operative position, said hollow pedestal formed integral with a base having an air grille in communication with said hollow pedestal to exhaust said cooling air into outside air, said base having a recessed turntable well with a peripheral thrust bearing seated therein in rotational supporting relationship with a recessed turntable having a vertical side wall with a bevel formed in an upper portion thereof to snugly receive a mixing bowl, said mixing bowl having a preselected diameter base and a substantially conical slightly convexly curved side wall formed integral with said base and snugly engaging said turntable bevel for good support thereby during mixing operations.

28. A food mixer as defined in claim 27 wherein said food processing elements comprise a pair of dough hooks, each of which have an interacting single helical portion, said dough hooks being disposed in a preselected relative rotational orientation so that said respective interacting helical portions define a preselected minimal distance therebetween, said preselected minimal distance being disposed at an upper portion of said dough hooks at the beginning of a driving cycle while a maximum distance between the helical portions is positioned therebelow to allow a quantity of dough to enter the space between the dough hooks, said preselected minimal distance moving downward as the dough hooks are rotated thereby compressionally kneading the dough and forcing it downwardly away from the upper portions while said upper portions progressively separate to knead the dough by pulling and stretching it as the minimal distance travels downwardly, one of said dough hooks being disposed adjacent the side wall of the mixing bowl and having a wiper arm formed integral with a lower end of the helical portion, said wiper arm being disposed at an angle with respect to the vertical substantially equal to an angle with respect to the vertical of a tangent taken at the point of the mixing bowl side wall closest to the wiper arm so that the wiper arm pulls dough away from the side wall of the mixing bowl and deposits it in the center of the mixing area to be further kneaded, said other dough hook being positioned substantially in the center of the mixing area and having a mixing foot positioned substantially parallel to the bottom of the mixing bowl to provide mixing of the dough ingredients during the early portions of the dough kneading process.

29. A food mixer comprising a stand having a base with a hollow upstanding pedestal portion, a rotatable turntable seated on a peripheral thrust bearing in a rotational mounting attitude with the base, said rotatable turntable having a circular floor and an upstanding side wall adapted to engage snugly a mixing bowl removably seated therein, a mixer head supported on said pedestal for movement between a lowered operative position in which mixing elements driven by said head are received in said mixing bowl and a retracted position in which said mixing elements are raised above said bowl, a latch mounted in an upper portion of the hollow pedestal portion and including a latch level pivotally connected to said pedestal, means cooperating with said latch lever to lock said mixer head against pivotal movement in either said retracted or operative position.

30. The food mixer of claim 29 wherein said means cooperating with said latch lever comprises a pair of pins mounted on said mixer head in spaced relation, said latch lever being engageable with said pins to lock said mixer head in said retracted or said operative position, spring means biasing said latch lever about its pivotal mounting into locking engagement with said pins, manual operating means connected to said lever and extending outside of said pedestal to permit latch lever to be rotated manually out of locking engagement with said pins.

31. The food mixer of claim 29 wherein said base is formed with a cylindrical pocket having a flat circular bottom wall, an annular ball bearing having a diameter slightly less than the diameter of said pocket, said rotatable turntable being received in said pocket and supported for rotation by said bearing.

32. The food mixer of claim 31 wherein said base and said turntable are formed with cooperating assembly means located at the axis of rotation of said turntable.

33. The food mixer of claim 32 wherein said assembly means include a slotted sleeve formed integrally with the bottom wall of said turntable and having radial latching projections, an opening in the bottom wall of said pocket which receives said sleeve to rotatably support said turntable in said pocket, said latch projections engaging the bottom of said base to retain said turntable in said pocket.

34. In a food mixer for kneading dough, a stand supported power mixing head having a pair of counter-rotating spindles which support a pair of dough kneading elements for rotation about two spaced vertical axes, said elements each including a shank portion, a helix portion and a helix supporting portion which interconnects the helix portion to the shank portion, said helix portions being coaxial with their respective shank portions, said helices being oppositely disposed and being mounted in said spindles so that they overlap in closely spaced relationship and rotate in a direction to force the dough being kneaded downwardly away from the mixing head.

35. The combination of claim 34 wherein one of said elements includes an L-shaped foot having a vertical portion extending downwardly from the lower end of the helix portion and a horizontal portion extending diametrically with respect to the axis of the shank portion.

36. The combination of claim 35 wherein the other of said elements is formed with a terminal portion which is angled with respect to the vertical and terminates at substantially the same horizontal plane as said L-shaped foot on said one element, a bowl supported on said stand for receiving dough to be kneaded by said elements, said terminal portion being angled to correspond to the angle of the wall of the bowl and positioned to wipe the wall of the bowl as it rotates.

37. In a food mixer having a stand with a hollow base and upright portion and a mixing head mounted thereon including a housing enclosing a drive motor and having a cooling fan operable thereby, a cooling system characterized by an air inlet opening positioned in said housing at a forward portion thereof whereby cooling air is drawn through said opening into said housing, air passage means between a rearward portion of said housing and said hollow upright portion of said stand whereby said cooling air passes out of said housing and downwardly through said upright portion of said stand and outwardly through an air outlet provided in the base of said stand.

38. A food mixer comprising an elongated tubular housing enclosing a motor which is drivingly connected to rotatable spindles for supporting mixing elements, a stand having a bowl supporting base and an upright column which pivotally supports said housing at the upper end thereof, said motor including a fan which draws cooling air inwardly through an opening in said housing, a discharge passage for said cooling air extending from said housing through said column and said base to discharge said cooling air at the bottom of said stand.

39. The mixer of claim 38 wherein said housing is pivoted to said column at one end thereof, cooling air intake openings disposed in said housing at the end remote from said one end, said fan being supported by said motor immediately above the pivotal connection between said housing and said column.

40. In a food mixer for mixing foodstuffs and kneading dough as defined in claim 9 wherein one of the dough kneading elements has a retainer spring, said retainer spring having a longitudinal wire portion positioned substantially parallel to a shank of said dough kneading element.

41. In a food mixer for mixing foodstuffs and kneading dough as defined in claim 40, said longitudinal wire portion being staked in a longitudinal slot in said shank to reduce the cross-sectional area of said shank by only a relatively small amount to minimize reduction in strength of said shank.

42. A food mixer comprising a stand having a base with a rotatable cup-shaped turntable fitted within a well in said base and seated in a rotational mounting attitude on a peripheral thrust bearing mounting within said well of the base, said rotatable turntable having relatively high side walls and being adapted to receive a mixing bowl nested therein, a mixer head supported on said base and oriented so that mixing elements driven by said mixer head are positioned substantially interiorly of said peripheral thrust bearing to provide a stable mixing assembly, said mixing elements extending within said cup-shaped turntable.

* * * * *